United States Patent [19]
Ogawa

[11] Patent Number: 5,326,732
[45] Date of Patent: Jul. 5, 1994

[54] CARBON-SILICON CARBIDE COMPOSITE MATERIAL AND METHOD FOR THE PREPARATION THEREOF

[75] Inventor: Ichitaro Ogawa, Tosu, Japan

[73] Assignee: Japan as represented by Director General of Agency of Industrial Science and Technology, Tokyo, Japan

[21] Appl. No.: 119,019

[22] Filed: Aug. 26, 1993

[51] Int. Cl.$^5$ ............................................. C04B 35/58
[52] U.S. Cl. ........................................ 501/90; 501/99; 264/65
[58] Field of Search .................... 501/88, 90, 99; 427/249; 51/307, 308; 264/65, 66; 423/345

[56] References Cited

U.S. PATENT DOCUMENTS

| | | | |
|---|---|---|---|
| 4,242,106 | 12/1980 | Morelock | 51/307 |
| 4,417,906 | 11/1983 | Ohno | 51/307 |
| 4,818,732 | 4/1989 | Fox et al. | 501/81 |
| 4,889,686 | 12/1989 | Singh et al. | 419/13 |
| 4,904,622 | 2/1990 | DuBots et al. | 501/88 |
| 4,915,924 | 4/1990 | Nadkarni et al. | 423/345 |
| 4,944,904 | 7/1990 | Singh et al. | 269/60 |
| 4,985,378 | 1/1991 | Ichikawa et al. | 501/89 |
| 5,010,043 | 4/1991 | Ringwood | 501/90 |
| 5,087,433 | 2/1992 | Enomoto et al. | 423/346 |
| 5,128,074 | 7/1992 | Steel et al. | 264/29.1 |
| 5,135,893 | 8/1992 | Dohi et al. | 501/91 |
| 5,221,526 | 6/1993 | Qi et al. | 423/345 |
| 5,246,736 | 9/1993 | Goujard et al. | 427/249 |
| 5,254,397 | 10/1993 | Kawai et al. | 428/245 |

*Primary Examiner*—Karl Group
*Assistant Examiner*—A. Wright
*Attorney, Agent, or Firm*—Wenderoth, Lind & Ponack

[57] ABSTRACT

Proposed is a novel composite material consisting of carbon as the matrix phase and particles of silicon carbide having an acicular or needle-like particle configuration uniformly and isotropically dispersed in the matrix phase as the reinforcing dispersed phase, in which the needle-like silicon carbide particles are formed by the in situ crystal growth from particles of $\beta$-silicon carbide in a shaped body of a powder blend consisting of particles of carbon and the powder of $\beta$-silicon carbide with further admixture of boron or a boron compound which promotes crystal growth of silicon carbide to have an acicular particle configuration.

6 Claims, 1 Drawing Sheet

FIGURE
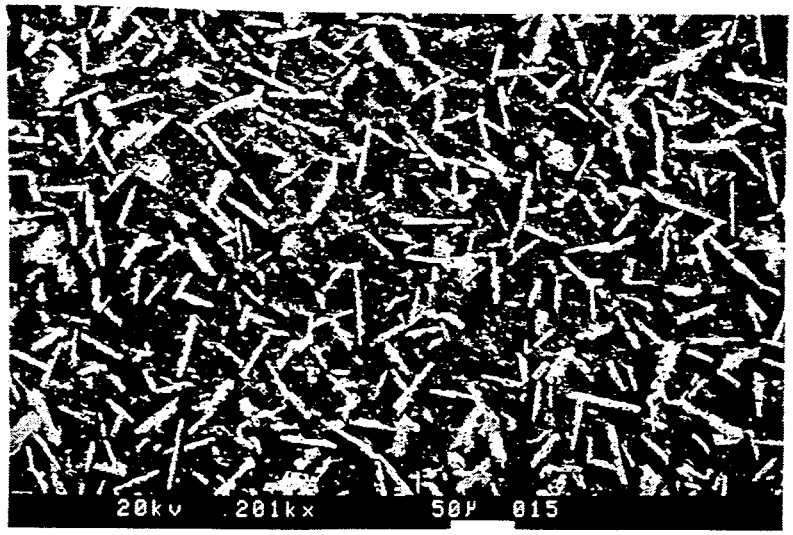

CARBON-SILICON CARBIDE COMPOSITE MATERIAL AND METHOD FOR THE PREPARATION THEREOF

BACKGROUND OF THE INVENTION

The present invention relates to a novel carbon-silicon carbide composite material and a method for the preparation thereof. More particularly, the invention relates to a carbon-silicon carbide composite body consisting of carbon as the matrix phase and silicon carbide as the dispersant phase dispersed in the matrix phase in an intimate state to serve as a reinforcing material so as to impart the composite material with greatly improved properties such as toughness, mechanical impact strength, resistance against heat shock, mechanical strengths, sliding characteristic, resistance against abrasion, resistance against erosion and so on as well as a method for the preparation thereof.

As is well known, shaped bodies of carbon are widely used as an engineering material by virtue of their excellent properties in many respects. One of the serious disadvantages of a shaped body based on carbon alone, however, is that the mechanical strength thereof is so low as not to be used as a constructing part. In this regard, many attempts and proposals have been made for developing a carbon-based composite material consisting of carbon as the matrix phase and a fibrous material, e.g., fibers and whiskers, as a reinforcing agent dispersed in the matrix phase. While such a carbon-based composite material is prepared usually by using a precursor of carbon such as a pitch or resin, to be carbonized by a heat treatment, a problem in such a carbon-based composite material is that the shaped body under the carbonization treatment exhibits great shrinkage and the resultant composite body is necessarily very porous.

A method has been proposed to solve the above mentioned problems in which a carbon-matrix composite material is formed with carbon fibers as the reinforcing agent and the composite body is subjected to a number of cycles each consisting of impregnation of the composite with a pitch and calcination of the pitch-impregnated composite so as to increase the density and improve other properties of the composite material. The application fields of this method, however, are limited because the procedure is very complicated and the method is not versatile in respect of the limited composite textures.

Another problem in carbon fiber-reinforced carbon-matrix composite materials is that, while the carbon fibers used as the reinforcing agent are usually in the form of long filaments, the composite material compounded with such long filaments is more or less anisotropic with limited applications so that it is desirable to use short fibers or whiskers in order to obtain an isotropic composite material. It is, however, not always a simple matter to obtain a fully uniform blend from a particulate or granular material for the matrix phase and a fibrous or acicular material for the reinforcing agent even in the use of short fibers or whiskers of carbon so that the mechanical strengths of the composite material cannot be as high as desired or expected. Even if uniformity could be ensured in blending of the matrix phase and the dispersed phase, the carbonaceous matrix material and the short fibers or whiskers are necessarily different in the behavior of thermal shrinkage in the course of calcination of the composite material which accordingly cannot be dense enough. Moreover, fibers embedded in the matrix phase of a composite material have a trend to be aligned, when the composite material is molded by compression, in the direction perpendicular to the direction of the compressive force not to give a fully isotropic shaped body of the composite material.

As is described above, carbon-based composite materials reinforced with a fibrous or acicular reinforcing agent prepared by the conventional method in the prior art have several problems and disadvantages. This is the reason for the very limited application fields of such composite materials despite the expected excellent and desirable properties thereof when the preparation process could be ideally performed. In addition, it is unavoidable in the preparation of conventional composite materials compounded with a fibrous or acicular reinforcing agent that the fibers or whiskers are more or less damaged to adversely affect the properties of the composite material.

The inventors have previously proposed (1) a method for the preparation of a composite material consisting of the matrix phase of carbon and the dispersed phase of particles of a ceramic material such as boron carbide and silicon carbide very uniformly dispersed in the matrix phase in Japanese Patent Publication No. 58-38386 and (2) an oxidation-resistant carbonaceous material prepared by the simultaneous compounding with particles of both boron carbide and silicon carbide to exhibit extremely high resistance against oxidation in Japanese Patent Publication No. 62-12191 and also discovered that a carbon-based composite having excellent resistance against oxidation and a large fracture energy can be obtained by compounding the above mentioned composite material further with short fibers of carbon.

Though with excellent oxidation resistance and a large fracture energy to be noteworthy for many applications, this last mentioned composite material has a problem due to the difference in the thermal expansion or shrinkage between the matrix phase and the dispersed phase that the denseness of the composite material cannot be high enough and the bulk density thereof after calcination is unavoidably low as compared with similar composite materials not compounded with short carbon fibers. The problems of damage in the fibrous material and low uniformity of dispersion thereof are of course not solved therein. Moreover, the high oxidation resistance of the composite material can be obtained only by the simultaneous compounding with silicon carbide particles so that the manufacturing process is necessarily complicated. As a possible alternative way, oxidation resistance could be imparted to the composite material by compounding with whiskers of silicon carbide in place of carbon fibers. However, silicon carbide whiskers have high rigidity as compared with carbon fibers so that silicon carbide whiskers are damaged more in the process blending than carbon fibers. It is reported, in Journal of the Japan Society for Composite Materials, volume 9, No. 3 (1983), that a composite material prepared from a graphite powder, a thermosetting resin as a binder and 2.5% by weight of acicular silicon carbide particles has a greatly improved abrasion resistance but the above mentioned problems are not solved therein.

SUMMARY OF THE INVENTION

The present invention accordingly has an object to provide a novel, highly isotropic composite material consisting of carbon as the matrix phase and silicon carbide in an acicular form as the dispersed phase in the matrix having excellent toughness, resistance against mechanical and thermal shocks, mechanical safety, sliding characteristics and resistance against erosion and free from the above described problems and disadvantages in the carbon-silicon carbide composite materials in the prior art as well as a method for the preparation thereof.

Thus, the carbon-silicon carbide composite material of the present invention is an integral shaped body consisting of carbon as the matrix phase and particles silicon carbide in an acicular or needle-like form as the reinforcing dispersed phase uniformly and isotropically dispersed in the matrix phase, the particles of silicon carbide being formed in the matrix phase by the in situ crystal growth of fine particles of $\beta$-silicon carbide.

The above defined novel carbon-silicon carbide composite material of the invention can be prepared by a method comprising the steps (a) blending 100 parts by weight of a combination of powders of carbon and from about 2% to about 20% by weight based thereon of boron or a boron compound calculated as boron with from 5 to 40 parts by weight of particles of $\beta$-silicon carbide to give a powder mixture;

(b) shaping the powder mixture into a form; and (c) subjecting the form of the powder mixture to a heat treatment or calcination at a temperature in the range from 2100° to 2500° C. for a length of time of at least 0.5 hour.

It is further preferable that the above mentioned powder mixture is additionally admixed with a zirconium compound such as zirconium boride or zirconium carbide so that the composite material can be imparted with further improved resistance against oxidation.

BRIEF DESCRIPTION OF THE DRAWING

The FIGURE is a microscopic photograph of the composite body prepared in the example showing the isotropic distribution of the acicular particles of silicon carbide in the matrix of carbon.

DETAILED DESCRIPTION OF THE PREFERRED EMBODIMENTS

As is described above, the novel carbon-silicon carbide composite material of the invention is characterized by the highly isotropic distribution of acicular particles of silicon carbide as a consequence of the in situ crystal growth of silicon carbide in the matrix of carbon. The in situ crystal growth of silicon carbide is accelerated by a heat treatment of particles of $\beta$-silicon carbide dispersed in the matrix of carbon in the presence of boron or a boron compound.

Namely, the composite material of the present invention consists of from about 60 to 95% by weight of carbon forming the matrix phase and from about 40 to 5% by weight of acicular particles of silicon carbide as a reinforcing agent uniformly and isotropically dispersed in the matrix phase. The matrix phase of carbon contains boron carbide as a consequence of the heat treatment of the shaped body of the powder mixture of carbon and silicon carbide containing boron or a boron compound at a high temperature of 2100° to 2500 ° C. The matrix phase can contain each a limited amount of other ceramic ingredients such as a carbide, nitride or boride of a metal such as zirconium, titanium, lanthanum, chromium, iron, aluminum, magnesium and the like.

Further, the acicular particles of silicon carbide dispersed in the matrix phase have a diameter in the range from 1 to 5 $\mu$m and a length in the range from 10 to 100 $\mu$m with an aspect ratio of at least 5 or, preferably, in the range from 10 to 30. When these parameters of the acicular form are not within the above mentioned ranges, the reinforcing effect by the dispersed phase of silicon carbide cannot be high enough.

The starting carbonaceous material for the matrix phase of carbon is not particularly limitative and various kinds of carbonaceous materials can be used including petroleum coke, pitch coke, organic resins, e.g., phenolic resins, and the like provided that the material is obtained in the form of powder. When a part of the carbonaceous starting material is replaced with a powder of natural graphite, the resultant composite material prepared according to the invention can be improved in certain physical properties such as the sliding characteristic and the like.

In the method of the present invention, a powder mixture is prepared by blending 100 parts by weight of a combination of the above mentioned carbonaceous material and a powder of boron or a boron compound with from 5 to 40 parts by weight of a powder of $\beta$-silicon carbide. It is essential that boron or a boron compound in the form of a powder is admixed with the above mentioned carbon powder with an object to promote crystal growth of the silicon carbide particles in an acicular particle configuration. The amount of the powder of boron or a boron compound admixed with the carbon powder is in the range from about 2% to about 20% by weight calculated as boron relative to the amount of the carbon powder. When the amount of the boron or boron compound powder is too large, an undesirable phenomenon takes place in the course of the heat treatment for sintering that the $\beta$-silicon carbide is transformed to have a coarse granular or plate-like particle configuration and no acicular particles can be obtained.

The silicon carbide particles blended with the carbon powder, from which the acicular particles of silicon carbide are formed by the in situ crystal growing to serve as a reinforcing agent of the matrix phase must be granular particles of the $\beta$-silicon carbide or of the cubic crystals of the space group 3C among the various crystallographic forms. While it is a general understanding heretofore accepted that secondary recrystallization of the particles of $\beta$-silicon carbide occurs when subjected to a heat treatment at a temperature higher than 2000 ° C. to give coarse particles of a platelet-like particle configuration and acicular particles of $\beta$-silicon carbide can be obtained only by a heat treatment at a temperature not exceeding 2000° C., it was a quite unexpected discovery that acicular particles of $\beta$-silicon carbide can be formed even when the heat treatment is conducted at a temperature higher than 2300 ° C. without forming platelet-like crystals when particles of $\beta$-silicon carbide are blended with a carbon powder containing boron or a boron compound to prepare a powder blend which is shaped into a form and subjected to a heat treatment according to the present invention so that the shaped body of the powder blend can be completely sintered to give a sintered body of the composite material having high mechanical strengths as reinforced with the acicular particles of $\beta$-silicon carbide.

In a preferable embodiment of the inventive method, the starting materials, i.e. carbon, boron or a boron compound and β-silicon carbide, each in the form of a powder are blended together each in a specified amount to give a powder blend which is shaped by compression molding into a desired form of a powder compact or green body. It is optional that the powder blend is admixed with pitch or a pre-polymer of a thermosetting resin as a binder. If necessary, the green body is first calcined at a temperature of 800° to 1500 ° C. so as to be imparted with an increased mechanical strength to withstand handling.

It is optional in the above described formulation of the powder mixture that at least a part of the β-silicon carbide is replaced with a powder of elementary silicon since elementary silicon reacts with carbon in the above described calcination treatment of the shaped body of the powder mixture at a temperature in the range from 800° to 1500 ° C. to form silicon carbide which serves as a precursor of the acicular crystals of silicon carbide. The origin of silicon powder used in the above mentioned purpose is not limitative including not only powders of pure silicon but also powders of other siliceous materials rich in the content of silicon such as, for example, ashes of rice husks.

It is further optional in the formulation of the powder blend that, though in a limited amount, a part of the particles of β-silicon carbide is replaced with short fibers of silicon carbide or whiskers. In addition, various kinds of additives have an effect of acceleration or control of the growth rate of the acicular crystals of silicon carbide, control of the particle configuration thereof and control of the interfacial condition between the matrix phase of carbon and the dispersed phase. Additives exhibiting such an effect can be selected from those known to have an influence on the growth of silicon carbide particles or transition of the crystalline structure thereof including compounds of a metal such as lanthanum, chromium, titanium, aluminum, magnesium and the like as well as nitrogen compounds. The composite material of the invention can be imparted with improved resistance against oxidation by the admixture of the powder blend with an oxidation-resistance improver including carbides and borides of a metal such as zirconium, titanium and aluminum.

In the next place, the thus obtained shaped body after calcination at a temperature in the range from 800° to 1500° C. is subjected to a heat treatment for sintering at a temperature in the range from 2100° to 2500° C. or, preferably, from 2200° to 2400° C. The length of time taken for this heat treatment is at least 0.5 hour and usually in the range from about 2 hours to about 10 hours in order to ensure full growth of the acicular crystals of silicon carbide in the matrix phase of carbon although a still longer time is required depending on the formulation of the starting powder blend, temperature of the heat treatment and other parameters. By this heat treatment, the starting particles of β-silicon carbide are converted by the crystal growth into acicular crystals of silicon carbide uniformly and isotropically dispersed in the matrix phase of carbon to give a high-density body of the composite material having excellent mechanical properties.

In the following, the novel carbon-silicon carbide composite material of the invention and the method for the preparation thereof are described in more detail by way of examples and comparative examples which, however, are never construed to limit the scope of the invention in any way.

The powdery starting materials used in these experiments include: a powder of raw coke having a particle size to pass a screen of 100 mesh opening or finer as the carbon source; particles of β-silicon carbide having a weight-average particle diameter of 0.27 μm, of which the content of SiC was 98% by weight (a product by Ibiden Co.) or a powder of α-silicon carbide having an average particle diameter of 0.8 μm and containing at least 98% of silicon carbide; a powder of boron carbide (#1200, a product by Denki Kagaku Kogyo Co.) having an average particle diameter of 2 μm; and a powder of zirconium boride having a weight-average particle diameter of 3.5 μm. The term of "parts" in the following always refers to "parts by weight".

EXAMPLE 1

A powder blend was prepared from 63.0 parts of the carbon powder and 37.0 parts of the powder of β-silicon carbide and the powder blend was compression-molded into a green body of 30 mm by 30 mm by 8 mm dimensions which was calcined first at 1000° C. in an atmosphere of argon and then subjected to a heat treatment at 2300° C. for 1 hour to effect sintering of the body.

The thus obtained sintered body of the composite material had a bulk density of 2.104 g/cm$^3$. A cross section of this sintered body was polished and microscopically examined to find that the crystals of silicon carbide had a particulate or granular configuration.

EXAMPLE 2

The preparation procedure of a sintered body of carbon-silicon carbide composite body was substantially the same as in Example 1 described above except that the powder blend to be shaped into a green body was prepared from 63.5 parts of the same coke powder, 33.2 parts of the same powder of β-silicon carbide, 3.3 parts of the boron carbide powder and 2.0 parts of the zirconium boride powder.

The thus obtained sintered body of the composite material had a bulk density of 2.185 g/cm$^3$. A cross section of this sintered body was polished and microscopically examined to find that the crystals of silicon carbide had a particulate or granular configuration and a short rod-like configuration.

EXAMPLE 3

The preparation procedure of a sintered body of carbon-silicon carbide composite body was substantially the same as in Example 1 described above except that the powder blend to be shaped into a green body was prepared from 64.2 parts of the same coke powder, 28.5 parts of the same powder of β-silicon carbide, 7.3 parts of the boron carbide powder and 2.0 parts of the zirconium boride powder.

The thus obtained sintered body of the composite material had a bulk density of 2,138 g/cm$^3$. A cross section of this sintered body was polished and microscopically examined to find that, as is shown in the photomicrograph of the attached drawing, the crystals of silicon carbide had a whisker-like configuration having an aspect ratio of 10 to 20.

EXAMPLE 4

The preparation procedure of a sintered body of carbon-silicon carbide composite body was substantially the same as in Example 1 described above except that the powder blend to be shaped into a green body was prepared from 64.2 parts of the same coke powder, 28.5 parts of the same powder of β-silicon carbide and 7.3 parts of the boron carbide powder.

The thus obtained sintered body of the composite material had a bulk density of 2,135 g/cm$^3$. A cross section of this sintered body was polished and microscopically examined to find that the crystals of silicon carbide had a whisker-like configuration having an aspect ratio of 10 to 20.

EXAMPLE 5

The preparation procedure of a sintered body of carbon-silicon carbide composite body was substantially the same as in Example 1 described above except that the powder blend to be shaped into a green body was prepared from 65.2 parts of the same coke powder, 21.8 parts of the same powder of β-silicon carbide, 13.0 parts of the boron carbide powder and 2.0 parts of the zirconium boride powder.

The thus obtained sintered body of the composite material had a bulk density of 2,120 g/cm$^3$. A cross section of this sintered body was polished and microscopically examined to find that the crystals of silicon carbide had a whisker-like configuration having an aspect ratio of 5 or smaller.

EXAMPLE 6

The procedure for the preparation of the sintered body of carbon-silicon carbide composite material was substantially the same as in Example 3 described above except that the temperature of the heat treatment for sintering was 2100° C. instead of 2300° C.

The thus obtained sintered body of the composite material had a bulk density of 2.137 g/cm$^3$. A cross section of this sintered body was polished and microscopically examined to find that the crystals of silicon carbide had a particulate or granular configuration.

EXAMPLE 7

The procedure for the preparation of the sintered body of carbon-silicon carbide composite material was substantially the same as in Example 5 described above except that the zirconium boride powder was omitted from the formulation of the powder blend and the temperature of the heat treatment for sintering was 2100° C. instead of 2300° C.

The thus obtained sintered body of the composite material had a bulk density of 2.114 g/cm$^3$. A cross section of this sintered body was polished and microscopically examined to find that the crystals of silicon carbide had a particulate or granular configuration.

EXAMPLE 8

The preparation procedure of a sintered body of carbon-silicon carbide composite body was substantially the same as in Example 2 described above except that the length of time of the heat treatment for sintering was extended to 3 hours instead of 1 hour.

The thus obtained sintered body of the composite material had a bulk density of 2.224 g/cm$^3$. A cross section of this sintered body was polished and microscopically examined to find that the crystals of silicon carbide had a whisker-like configuration having an aspect ratio of 10 to 20.

EXAMPLE 9

The preparation procedure of a sintered body of carbon-silicon carbide composite body was substantially the same as in Example 2 described above except that the powder of β-silicon carbide was replaced with the same amount of a powder of α-silicon carbide.

The thus obtained sintered body of the composite material had a bulk density of 2.227 g/cm$^3$. A cross section of this sintered body was polished and microscopically examined to find that the crystals of silicon carbide had a particulate or granular configuration.

EXAMPLE 10

Shaped bodies were prepared in the same manner as in the preceding examples from a powder blend consisting 69.0 parts of the coke powder, 24.5 parts of the β-silicon carbide powder and 6.5 parts of the boron carbide powder and the shaped bodies were subjected to a heat treatment at a temperature of 2200° C., 2300° C. or 2400° C. for a length time of up to 20 hours. The thus obtained bodies of the composite material were subjected to the measurement of the fracture toughness $K_{IC}$ in MPa·m$^{\frac{1}{2}}$ to obtain the results tabulated below.

| Time, hours | Heat treatment temperature, °C. | | |
| --- | --- | --- | --- |
| | 2200 | 2300 | 2400 |
| 1 | — | 1.61 | — |
| 3 | — | — | 1.81 |
| 6 | 1.25 | 1.71 | 1.90 |
| 20 | 1.30 | 1.95 | — |

What is claimed is:

1. A carbon-silicon carbide composite material which is an integral shaped body consisting essentially of carbon as the matrix phase and particles of silicon carbide in an acicular or needle-like configuration as the reinforcing dispersed phase uniformly and isotropically dispersed in the matrix phase, the particles of silicon carbide being formed in the matrix phase by the in situ crystal growth.

2. The carbon-silicon carbide composite material as claimed in claim 1 in which the particles of silicon carbide in an acicular or needle-like configuration have a diameter in the range from 1 to 5 μm and a length in the range from 10 to 100 μm with an aspect ratio of at least 5.

3. The carbon-silicon carbide composite material as claimed in claim 1 in which the content of the particles of silicon carbide in an acicular or needle-like configuration is in the range from 5 to 40% by weight.

4. A method for the preparation of a carbon-silicon carbide composite material as an integral shaped body consisting of carbon as the matrix phase and particles of silicon carbide in an acicular or needle-like configuration as the reinforcing dispersed phase uniformly and isotropically dispersed in the matrix phase which comprises the steps of:

(a) blending 100 parts by weight of a combination of powders of carbon and from 2 to 20% by weight based thereon of boron or a boron compound calculated as boron with from 20 to 40 parts by weight of particles of β-silicon carbide having a granular particle configuration to give a powder blend;

(b) shaping the powder blend into a form; and (c) subjecting the form of the powder blend to a heat treatment at a temperature in the range from 2100° to 2500° C. for at least 0.5 hour.

5. The method for the preparation of a carbon-silicon carbide composite material as claimed in claim 4 in which the temperature for the heat treatment in step (c) is in the range from 2200° to 2400° C.

6. The method for the preparation of a carbon-silicon carbide composite material as claimed in claim 4 in which the length of time for the heat treatment in step (c) is in the range from 2 to 10 hours.

* * * * *